(12) United States Patent
Spani

(10) Patent No.: US 9,041,340 B2
(45) Date of Patent: May 26, 2015

(54) SYSTEMS AND METHODS FOR IN-VEHICLE CHARGING OF PALLET JACK BATTERIES

(71) Applicant: Wayne M Spani, San Diego, CA (US)

(72) Inventor: Wayne M Spani, San Diego, CA (US)

( * ) Notice: Subject to any disclaimer, the term of this patent is extended or adjusted under 35 U.S.C. 154(b) by 330 days.

(21) Appl. No.: 13/773,187

(22) Filed: Feb. 21, 2013

(65) Prior Publication Data

US 2014/0232339 A1 Aug. 21, 2014

(51) Int. Cl.
*H02J 7/00* (2006.01)
*H02J 7/14* (2006.01)

(52) U.S. Cl.
CPC ............ *H02J 7/0024* (2013.01); *H02J 7/0021* (2013.01); *H02J 7/0054* (2013.01); *H02J 7/14* (2013.01)

(58) Field of Classification Search
CPC ...................................................... H02J 7/0052
USPC .......... 320/103, 104, 109, 116–119; 187/276, 187/277, 289.29, 413; 280/43.12
See application file for complete search history.

(56) References Cited

U.S. PATENT DOCUMENTS 7,504,948 B2 * 3/2009 Wulff et al. ................. 340/572.1
8,324,860 B2 * 12/2012 Young et al. ................... 320/109
8,869,944 B2 * 10/2014 McCabe et al. ............... 187/226

* cited by examiner

*Primary Examiner* — Richard V Muralidar
(74) *Attorney, Agent, or Firm* — James A. Italia; Italia IP

(57) ABSTRACT

Systems and methods for in-vehicle charging of pallet jack batteries are provided. An example system allows using a power source of a host vehicle configured to provide power at voltage levels lower than the operating voltage of the pallet jack battery stack. The system may allow, for example, charging a 24 volts pallet jack battery stack from a 12 volts power source of the host vehicle. The system may further comprise an interconnecting circuit having a plurality of contactors electrically coupling the batteries in parallel for charging and serially for discharging. The system may further comprise a voltage monitoring circuit to detect whether the pallet jack is connected to the host vehicle power source for charging. Based on the detection, the voltage monitoring circuit may reconfigure the interconnecting circuit to electrically couple the pallet jack batteries in parallel.

20 Claims, 6 Drawing Sheets

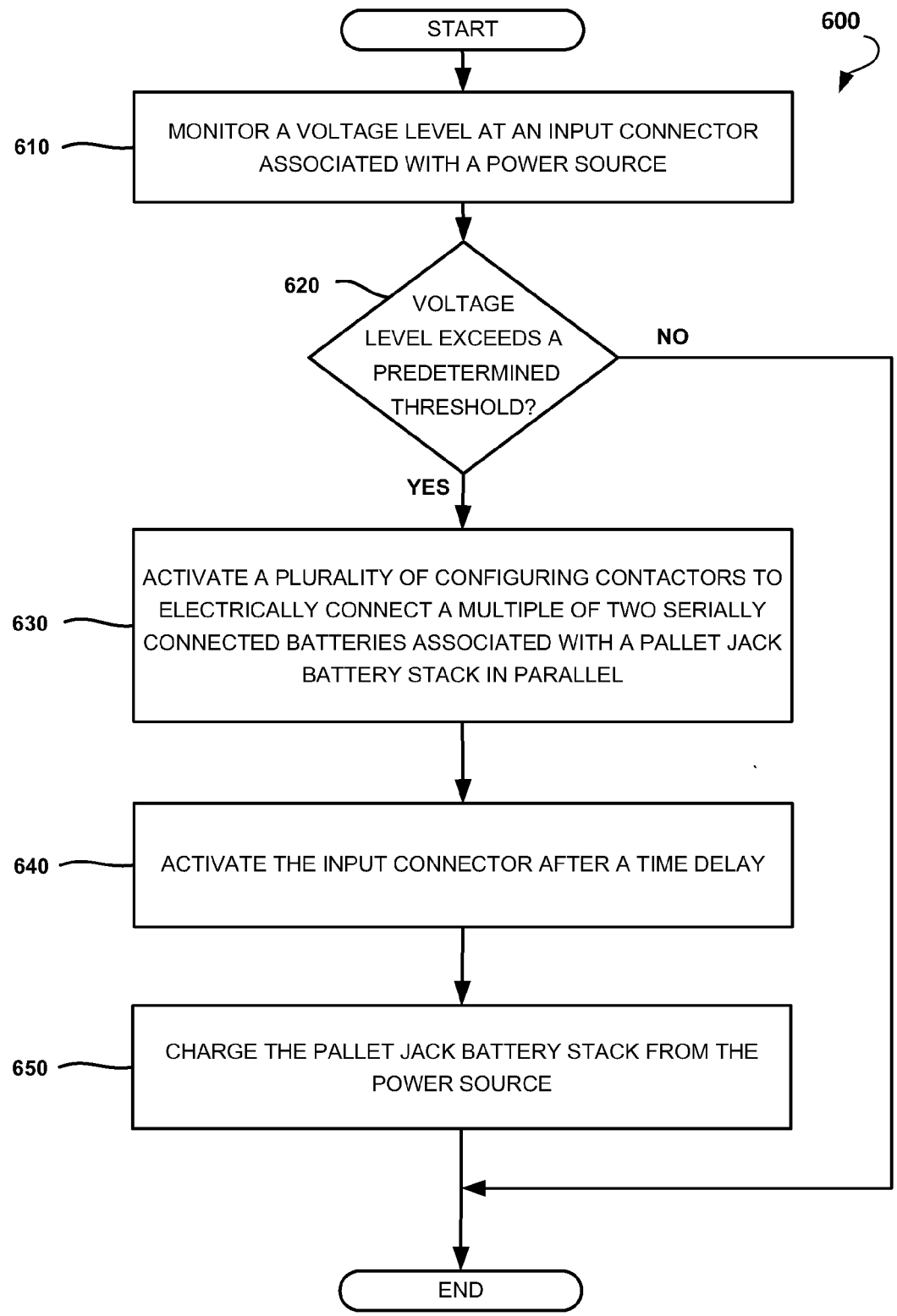

SYSTEMS AND METHODS FOR IN-VEHICLE CHARGING OF PALLET JACK BATTERIES

TECHNICAL FIELD

This disclosure generally relates to electric batteries and, more specifically, to methods and systems for in-vehicle charging of pallet jack battery stacks using an adaptive interconnection scheme.

BACKGROUND

Powered pallet jacks, also known as electric pallet trucks, walkies, single or double pallet jacks, or power jacks, allow lifting and moving heavy and stacked pallets or other loads. Typically, such powered pallet jacks (hereinafter referred to as a "pallet jack" for simplicity) are electrically motorized tools having an electrical motor and a platform for carrying and lifting loads.

While pallet jacks are often used in warehouses, storages, factories, the pallet jacks may also be transported to job sites by a host vehicle such as a trailer or truck. A typical pallet jack runs on electric batteries and when the batteries are low the pallet jack has to be moved to a charging station to recharge. This results in considerable down time and driver standby time. Currently, charging of the pallet jacks while transporting to a job site is not possible because the standard pallet jack battery voltage is 24 volts while the standard host vehicle voltage is 12 volts. Consequently, pallet jacks have to be frequently moved to remote charging stations for charging.

BRIEF DESCRIPTION OF THE DISCLOSURE

According to one or more example embodiments of the disclosure, there are provided methods and systems for charging a pallet jack battery stack using a power source of a host vehicle configured to provide power at voltage levels considerably lower than the voltage of the pallet jack battery stack. In certain example embodiments, the methods and systems disclosed herein provide a technique for charging a 24 volt pallet jack battery stack using a 12 volts power source of host vehicle. Thus, the pallet jack may be charged while being transported by the host vehicle without the need to periodically move the pallet jack to a charging station.

According to various example embodiments, there is provided an interconnecting circuit having a plurality of electrically controllable contactors which may electrically couple pallet jack batteries in parallel for charging and serially for discharging (i.e. operation of the pallet jack). Additionally, a voltage monitoring circuit may be provided to monitor and detect connections between the pallet jack and the host vehicle power source. When the voltage monitoring circuit detects that the pallet jack is connected to the host vehicle power source (e.g., an input voltage level exceeds a predetermined level), the voltage monitoring circuit may trigger a reconfiguration of the interconnecting circuit to electrically couple the pallet jack batteries in parallel as well as connecting the pallet jack batteries to the power source for charging. Alternatively, when the pallet jack is not connected to the power source (e.g., the input voltage level is below the predetermined level), the voltage monitoring circuit may configure the interconnecting circuit to electrically couple the pallet jack batteries serially as to enable normal operations of the pallet jack.

Additional systems, methods, apparatuses, features, and aspects are realized through the techniques of various embodiments of the disclosure. Other embodiments and aspects of the disclosure are described in detail below and are considered a part of the claimed disclosure. Other embodiments and aspects can be understood with reference to the description and the drawings.

BRIEF DESCRIPTION OF THE DRAWINGS

Figure 1:
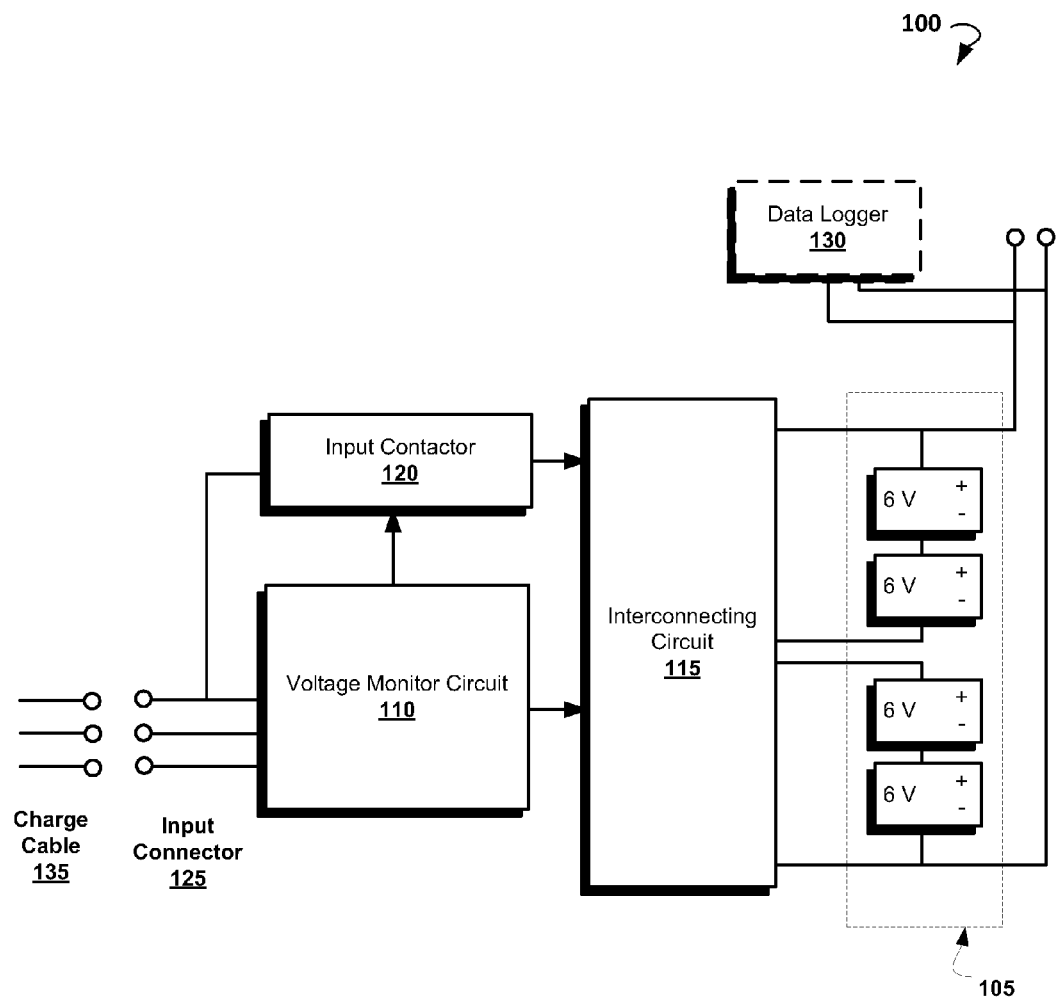

Having thus described the disclosure in general terms, reference will now be made to the accompanying drawings, which are not necessarily drawn to scale, and wherein:

FIG. 1 is an example high level block diagram of a system for in-vehicle charging of pallet jack battery stack.

Figure 2:
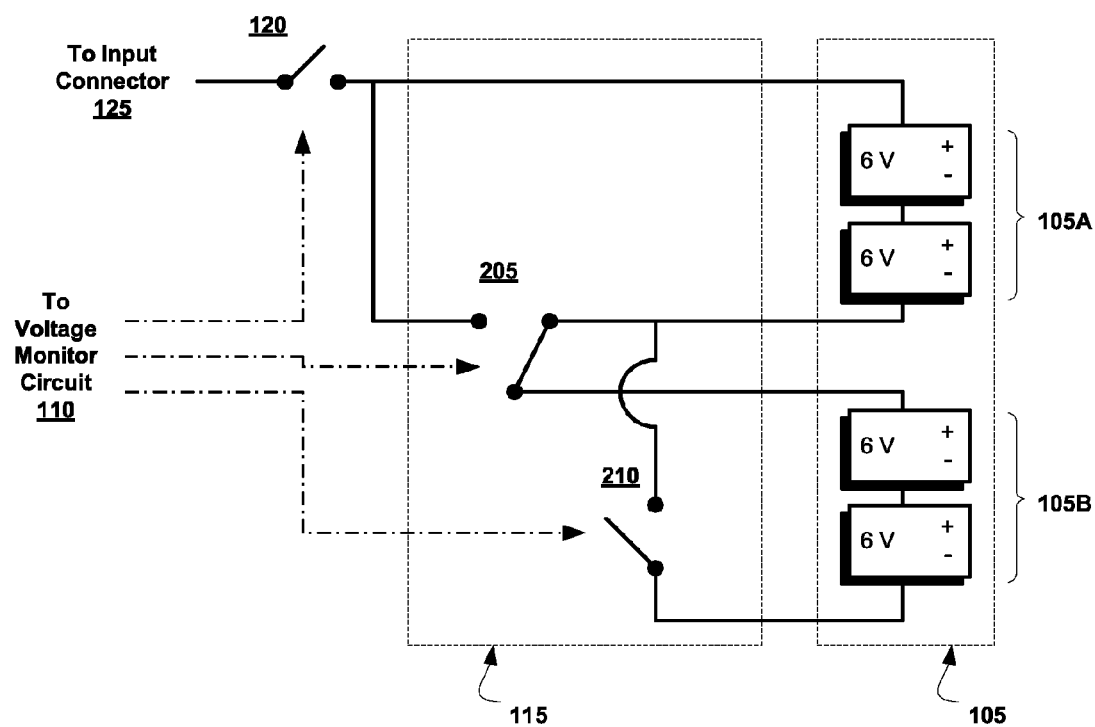

FIG. 2 is an example topology of an interconnecting circuit connected to various components of a system for in-vehicle charging of pallet jack battery stack.

Figure 3:
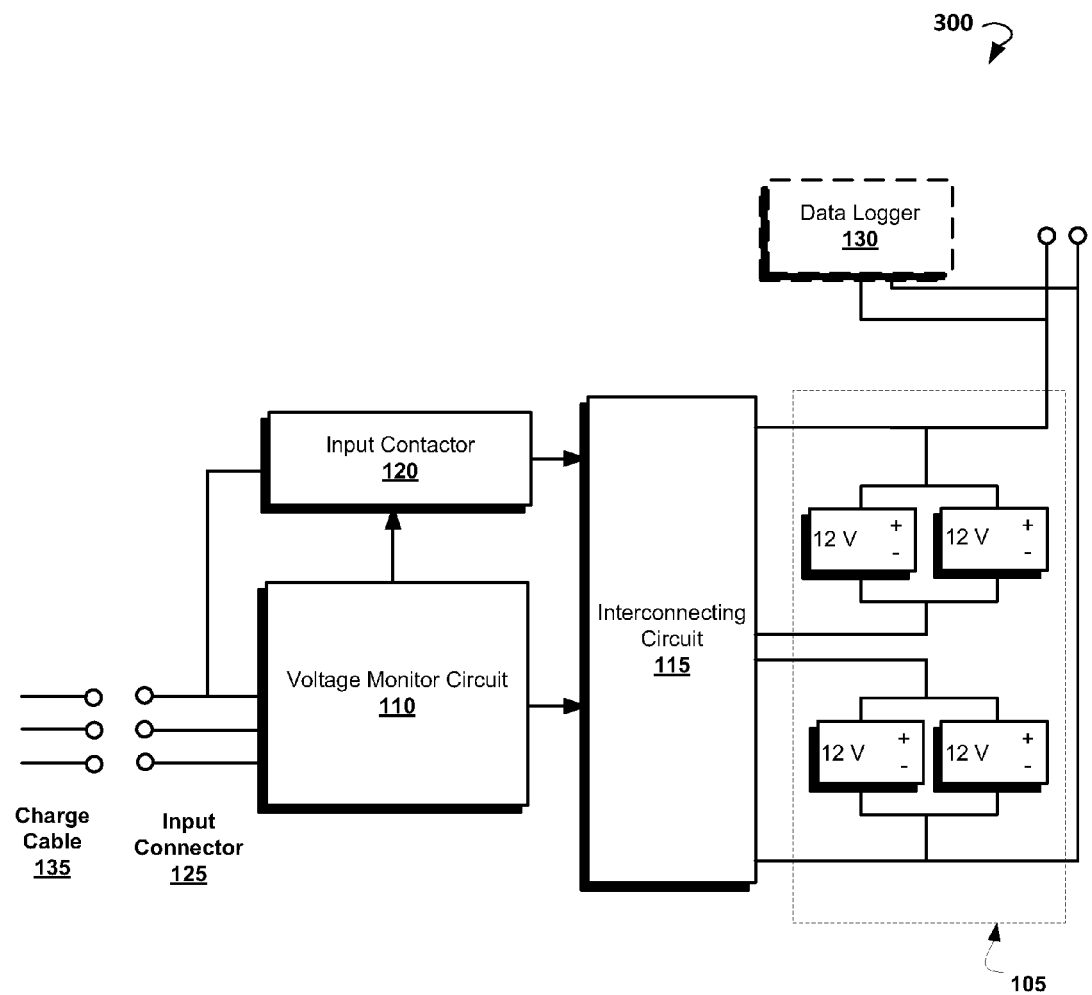

FIG. 3 is another example high level block diagram of a system for in-vehicle charging of a pallet jack battery stack.

Figure 4:
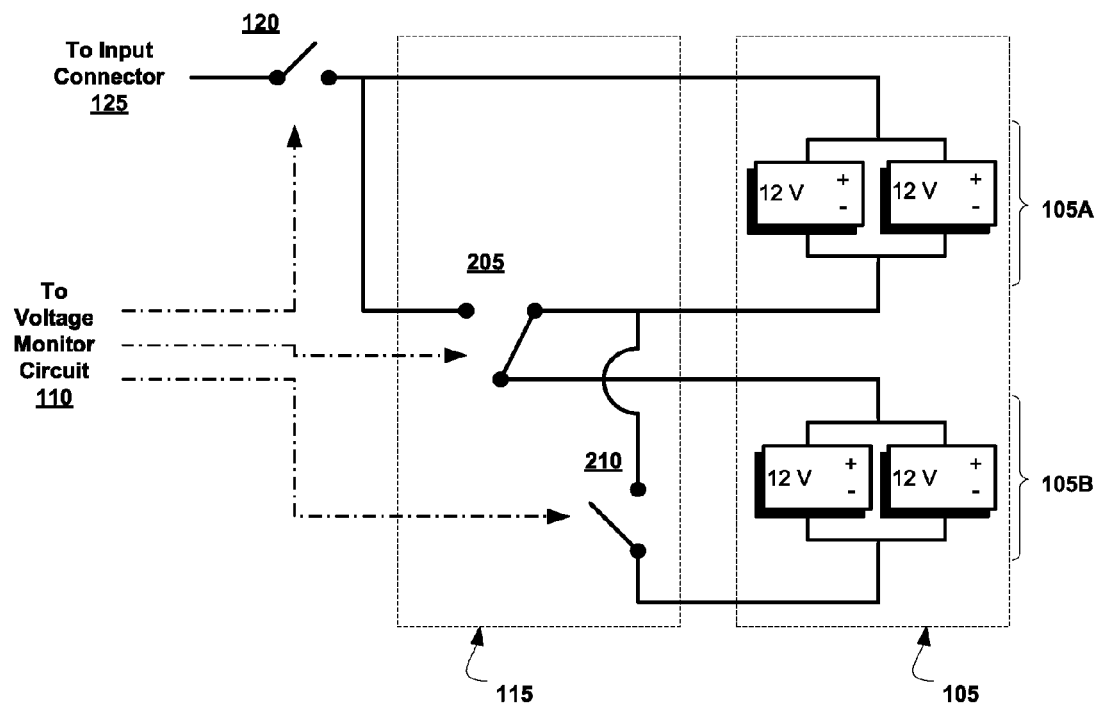

FIG. 4 is another example topology of an interconnecting circuit connected to various components of a system for in-vehicle charging of pallet jack battery stack.

Figure 5:
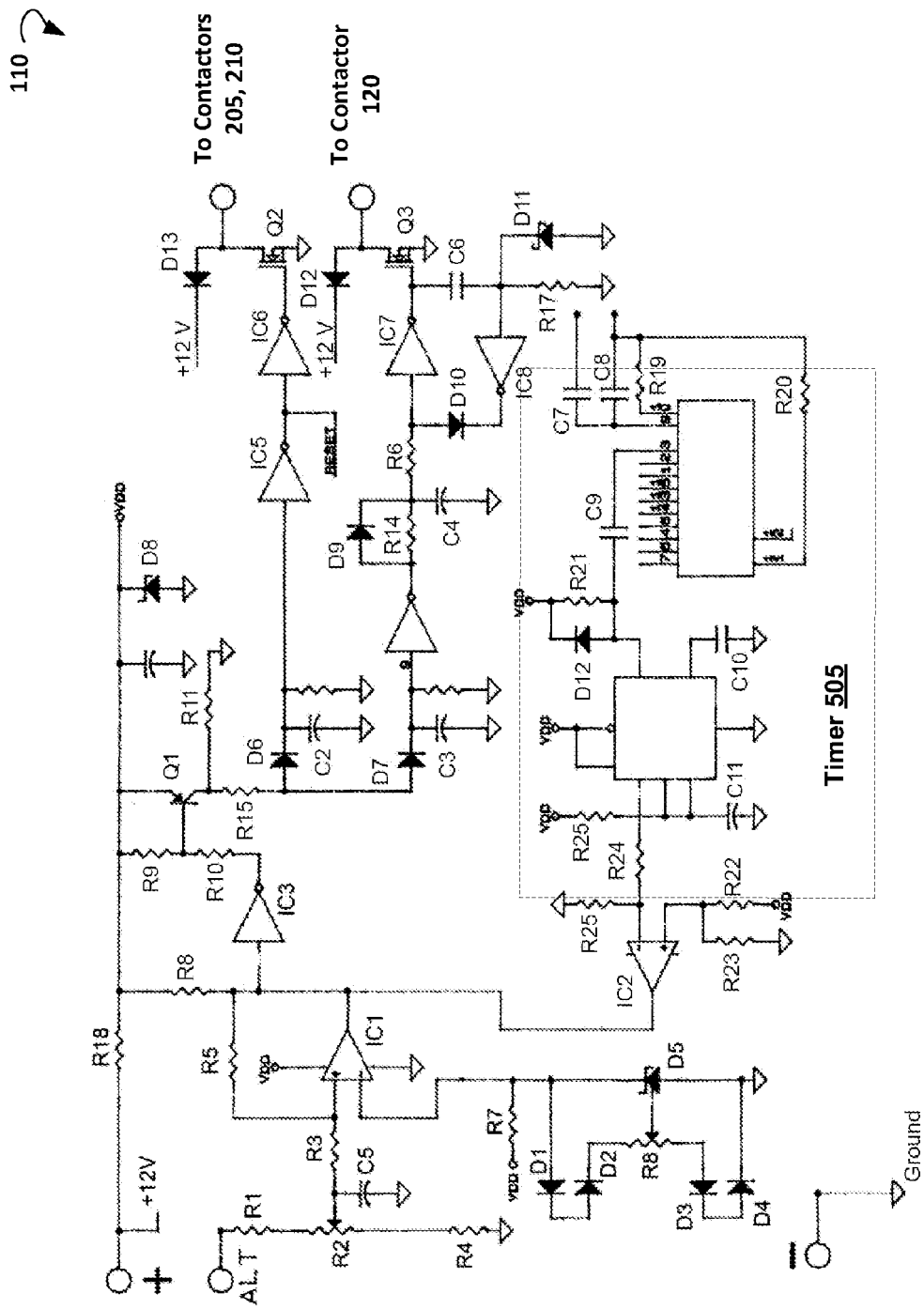

FIG. 5 is an example topology of a voltage monitoring circuit.

FIG. 6 is an example flow diagram of a method for in-vehicle charging of pallet jack battery stack.

DETAILED DESCRIPTION

Illustrative embodiments of the disclosure now will be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields, electron spins particles, electrospins, or any combination thereof.

The term "topology" as used herein refers to interconnections of circuit components and, unless stated otherwise, indicates nothing of physical layout of the components or their physical locations relative to one another. Figures described or otherwise identified as showing a topology are no more than a graphical representation of the topology and do not necessarily describe anything regarding physical layout or relative locations of components.

Technology Overview

Systems and methods disclosed herein enable maintaining pallet jack batteries charged while transported by a host vehicle. Because voltages of the pallet jack and host vehicle are incompatible, the pallet jack batteries may be interconnected to allow operating in a voltage compatible with the host vehicle. There are provided two interconnection modes: in a first mode, the pallet jack batteries are interconnected in parallel to allow them to charge from a host vehicle power source while the host vehicle is in transit or parked, and in a second mode, the pallet jack batteries are interconnected serially to allow discharging or, in other words, powering the pallet jack for normal operation. This approach eliminates the need for pallet jack to be periodically recharged at a charging station. Thus, the disclosed systems and methods may provide for continuous charging of the pallet jack batteries while the host vehicle is running, thereby reducing down time due to low batteries as well as reducing driver standby time by bypassing check in and check out equipment.

In some example embodiments, a system for in-vehicle pallet jack charging of pallet jack battery stack may be implemented by making modifications to the host vehicle and/or the pallet jack in order to make their respective electrical circuits compatible when charging. In an example embodiment, the pallet jack battery stack may include multiples of two batteries. There may be provided an interconnecting circuit having a plurality of configuring contactors which may be activated in order to configure a battery interconnection scheme as to allow the pallet jack battery stack to operate at a voltage level compatible with the host vehicle power source voltage level. Once the reconfiguration is complete, the pallet jack battery stack can be charged from the vehicle power source.

In some example embodiments, a further contactor for locking off the batteries from the power source when the batteries are not charged or coupled to the power source may be provided. The activation of the plurality of configuring contactors and the further contactor may be performed with a time delay to ensure that the batteries are charged after the interconnection scheme is reconfigured and to ensure that the power source is not connected to the batteries during the configuration process. The contactors may be powered by the pallet jack battery stack to eliminate dependency on external power sources.

The plurality of configuring contactors and the further contractor may be controlled by a voltage monitoring circuit that may monitor a voltage level of an input current. Once the system for charging the pallet jack battery stack is connected to the vehicle power source with a cable, the voltage monitoring circuit may detect that the input voltage level exceeds a predetermined voltage level. Based on the detection, the voltage monitoring circuit may reconfigure the interconnecting circuit and, specifically, reconfigure the plurality of contactors to electrically interconnect the batteries of the pallet jack battery stack in parallel. Additionally, the further contactor may be activated to allow current from the power source to flow to the pallet jack battery stack for charging. A user may be informed of a charging state in any suitable manner such as, for example, by powering a visual indicator, providing an audio signal, sending a text message, generating a wireless signal to a peripheral electrical device, and the like.

The input voltage level may be continually monitored, and once it is detected that the input voltage level drops below the predetermined voltage level, the voltage monitoring circuit may reconfigure the interconnecting circuit to its initial state so that the batteries of the pallet jack battery stack are connected serially. In certain example embodiments, an auxiliary timer may be provided to track time elapsed after the interconnection scheme is reconfigured. For example, after one hour after the interconnection scheme is reconfigured, the timer may cause the voltage monitoring circuit to reconfigure the interconnection scheme its initial state. Once the interconnection scheme is reconfigured to its initial state, the voltage monitoring circuit may verify that the input voltage level is changed in order to decide whether the interconnection scheme is to be configured to allow charging. This approach allows preventing discharging of the jack pallet batteries, if the power source is shut down while the charge cable is left plugged in.

Example System Topology

Referring now to the drawings, FIG. 1 shows an example high level block diagram of system 100 for in-vehicle charging of pallet jack battery stack. As shown in FIG. 1, the system may include a pallet jack battery stack 105 which may include two, four, six, eight, ten or more electrical batteries, electrochemical cells, fuel cells, accumulators, or any other storage devices capable of storing electrical charge (hereinafter referred to as "batteries" for simplicity). In an example, there are four 6 volt batteries, which when interconnected serially may provide substantially a 24 volt output, and when interconnected with two pairs in series, each providing 12 volts and those pairs connected in parallel, may provide substantially a 12 volt output.

The system 100 may include a voltage monitoring circuit 110, an interconnecting circuit 115, an input contactor 120, an input connector 125, and an optional data logger 130. The voltage monitoring circuit 110 may be electrically coupled to the input connector 125, detect whether a charge cable 135 is electrically connected to the input connector 125, and detect a voltage level of a current flowing into the system 100. Additionally, the voltage monitoring circuit 110 may be configured to control the operation of the input contactor 120 and the interconnecting circuit 115, respectively. More specifically, the interconnecting circuit 115 may have two or more configuring contactors which may electrically couple two sets of serially connected batteries 105 in parallel or serial. The voltage monitoring circuit 110 may activate these configuring contactors to change an interconnection scheme of the batteries (e.g., from a parallel connection to a serial connection, or vice versa) based on the level of input voltage. The voltage monitoring circuit 110 may also activate/deactivate the input connector 125 based on the level of input voltage. The operation of the voltage monitoring circuit 110 is discussed below in greater detail.

The configuring contactors of the interconnecting circuit 115 and the input contactor 120 may include any suitable electrical switching devices, relays, or any other circuit allowing to electrically connect/disconnect two or more electrical connections/terminals. One may appreciate that the contactors 115, 120 may be operated at a lower voltage generated by the voltage monitoring circuit 110 or similar electronics.

In certain embodiments, the system 100 may be provided with the auxiliary and optional data logger 130 configured to store any events associated with the operation of the pallet jack battery stack 105, the voltage monitoring circuit 110, and/or the interconnecting circuit 115. Furthermore, the system 100 may include an indicator (not shown) to indicate charging of the pallet jack battery stack 105 or a specific configuration of the interconnecting circuit 115. Other optional devices, such as an audio device for providing an audio signal associated with the charging, a transmitter to generate a command associated with the charging and transmitted wirelessly or via a wire to another electrical device may be provided. One may appreciate that any other suitable devices can be utilized. In addition, it should be clear that the system 100 may have fewer numbers of elements while providing the same or similar functionality.

FIG. 2 shows an example topology of the interconnecting circuit 105 and its electrical connection to the pallet jack battery stack 105 and other components of the system 100. As shown in FIG. 2, the pallet jack battery stack 105 may be electrically coupled to the input connector via the input contactor 120 and via two configuring contactors 205, 210 of the interconnecting circuit 115. The contactors 120, 205, 210 may be operated (triggered, activated) by the voltage monitoring circuit 110 or its components as described herein. As illustrated in FIG. 2, the contactors 120 and 210 may include single pole contactors (also known as one-way switch), while the contactor 205 may include a single pole changeover contactor (also known as a two-way switch).

According to some example embodiments, the configuring contactors 205, 210 may be activated/deactivated slightly sooner than the activation of the input contactor 120. During the configuring for charging, the input contactor 120 does not close (make connection) until after the configuring contactors 205, 210 have configured the stack to 12 volts. When it's determined to return the stack to normal operation (24 volts), the input contactor opens before the configuring contactors are changed. As will be appreciated by those skilled in the art, the simultaneous and corresponding operation of the configuring contactors 205, 210 may enable electrical connection of the batteries 105A and 105B to the pallet jack battery stack 105 in parallel or serially. It should be also clear that the interconnecting circuit 115 may include more than two contactors depending on a particular application.

FIG. 3 shows another example high level block diagram of system 300 for in-vehicle charging of pallet jack battery stack. The system 300 is similar to the system 100 shown in FIG. 1. However, the system 300 includes a different type of batteries used in the battery stack 105. As shown in FIG. 3, there are four 12 volt batteries, two pairs of batteries each interconnected in parallel. When these two pairs of batteries are interconnected in series, the battery stack 105 provides a 24 volt output, alternatively, when the two pairs of batteries are interconnected in parallel, the battery stack 105 provides a 12 volt output.

Similarly, FIG. 4 shows an example topology of the interconnecting circuit 105 as well as its electrical connection to the components of the system 300. Additionally, FIG. 4 shows the pallet jack battery stack 105 having two pairs of batteries 105A, 105B connected in parallel. The topology shown in FIG. 4 provides for operations similar to the ones described above with reference to FIG. 2.

FIG. 5 shows an example topology of the voltage monitoring circuit 110. The operation of the voltage monitoring circuit 110 may be dependent upon the monitoring of the voltage of the charge cable 135, which is electrically connected to the host vehicle power source, e.g., a vehicle's 12 volt alternator. In an example embodiment, a voltage level of 13.2 volts or greater may indicate that the alternator (not shown) is connected to the circuit 110 and active (i.e. provides power to the circuits 110, 120). A voltage level of 12.6 volts or less may indicate that the alternator is inactive or the charge cable 135 is not plugged into the input connector 125. The power for the circuit 110 may be derived from the pallet jack battery stack 105.

Still referring to FIG. 5, the charging cable 135 from the vehicle's alternator may be connected to a corresponding input "ALT" shown in this figure and optionally to the input "−." The input "ALT" may be electrically connected to a voltage comparator IC1 through a voltage divider network including resistors R1, R2 and R3. Further, a 5 Volts reference voltage may be generated by diodes D1-D5 connected to the negative input of the comparator IC1. If the input voltage is greater than, for example, 13.2 volts (active alternator), the divided voltage generated by the resistors R1-R3 will be greater than 5 Volts and the comparator IC1 output will switch to a positive level causing the output of inverter IC3 to a negative level (e.g., the ground level), which in turn switches a bipolar junction (PNP) transistor Q1 on, thereby electrically connecting $V_{DD}$ power (e.g., +12 Volts) to driver circuits of the contactors 120, 205, and 210.

Once the 12 Volts signal is fed to components C2, R12, IC5, and IC6, a MOSFET Q2 is turned on after a short delay driving contactors 205, 210 to electrically connect the batteries of the pallet jack battery stack 105 in parallel, i.e. "reconfiguring" the batteries from 24 volts to 12 volts. At the same time, after a longer delay when the 12 volts signal is fed to components C3, R13, IC4, D9, R14, C4, R16, and IC7, a MOSFET Q3 may be turned on, which in turn may trigger the input contactor 120, thereby electrically connecting the alternator to the re-configured 12 volts pallet jack battery stack 105.

According to one or more embodiments, each time the interconnecting circuit 115 is reconfigured, a timer 505 may start a virtual one hour countdown. The timer 505 may be re-started after each re-configuration sequence. At the end of one hour cycle, if no reconfiguration has occurred with respect to the interconnecting circuit 115, the timer may trigger, for example, a five second pulse applied through a gate circuit IC2 causing the transistor Q1 to turn off, thereby releasing the contactors 120, 205, 210 in a proper sequence. If, after the five second cycle, the input voltage is still greater than, for example, 13.2 volts, the voltage monitoring circuit 110 may again reconfigure the contactors 120, 205, 210 as described above.

Still referring to FIG. 5, if the charging cable 135 is removed or power is not provided to the input connector 125, the input voltage to the comparator IC1 will decrease to about zero voltage, thereby causing the input voltage to the inverter IC3 to decrease and turn off the transistor Q1. Because of the components D9, D10, D11, IC8, C6 and R17, the delay to MOSFET Q3 is shorter than the delay to the MOSFET Q2. Consequently, the input contactor 120 may disconnect the power source from the batteries 105 before the batteries are re-configured to the 24 volts operation mode. This approach prevents discharging of the jack pallet batteries when the power source is shut down while the charge cable is left plugged in.

Example Operation Method

FIG. 6 shows an example flow diagram of a method 400 for in-vehicle charging of pallet jack battery stack 105, according to one or more embodiments of the disclosure. The method 600 may be implemented by systems 100, 300 as described above with reference to FIGS. 1-5.

The method 600 may commence in operation 610 with the voltage monitoring circuit 110 monitoring a voltage level at the input connector 125 associated with the power source of the host vehicle. In operation 620, the voltage monitoring circuit 110 may determine whether the voltage level exceeds a predetermined voltage level (e.g., any fixed voltage in between 12-14 volts).

If it is determined that the voltage level exceeds the predetermined value, the method 600 may proceeds to operation 620 and activate the plurality of configuring contactors 205, 210 to electrically reconfigure two or higher multiples of two batteries 105A, 105B associated with the pallet jack battery stack 105 from serial connection to parallel connection. In operation 630, the voltage monitoring circuit 110 may activate, with a delay, the input connector 120 after the plurality of configuring contactors 205, 210 are activated. In operation 640, the pallet jack battery stack 105 may charged from the power source. In an optional step (not shown), an audio or visual indication of a charging status may be provided.

If, on the other hand, it is determined in operation 620, that the voltage level does not exceed the predetermined value, the method 600 may terminate. Those skilled in the art, however, will appreciate that additional operations may be practiced by the method 600.

Although the embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for in-vehicle charging of a pallet jack batteries, the method comprising:
   monitoring a voltage level of a power source associated with a host vehicle;
   based on the monitoring, configuring an interconnecting circuit associated with a pallet jack battery stack of a pallet jack to enable charging of the pallet jack battery stack at a voltage level of the power source associated with the host vehicle;
   electrically coupling the pallet jack battery stack to the power source; and
   charging the pallet jack battery stack from the power source.

2. The method of claim 1, wherein the configuring of the interconnecting circuit comprises:
   configuring the interconnecting circuit in a first mode when the voltage level exceeds a predetermined voltage level; and
   configuring the interconnecting circuit in a second mode when the voltage level is below a predetermined voltage level.

3. The method of claim 2, wherein the interconnecting circuit in the first mode is configured to electrically couple two or more batteries of the pallet jack battery stack in parallel and wherein the interconnecting circuit in the second mode is configured to electrically couple the two or more batteries of the pallet jack battery stack serially.

4. The method of claim 2, wherein the pallet jack battery stack is configured to be charged when the interconnecting circuit operates in the first mode, and wherein the pallet jack battery stack is configured to be discharged when the interconnecting circuit operates in the second mode.

5. The method of claim 2, wherein the predetermined voltage level is between 12 and 14 volts.

6. The method of claim 2, wherein the pallet jack battery stack includes two or more batteries, the two or more batteries being configured to operate at substantially 24 volts when coupled serially by the interconnecting circuit.

7. The method of claim 2, wherein the power source associated with the host vehicle is configured to supply substantially 12 volts.

8. The method of claim 1, wherein the configuring of the interconnecting circuit comprises:
   activating a plurality of configuring contactors electrically connected to the pallet jack battery stack;
   activating an input contactor electrically connected to the pallet jack battery stack; and
   electrically coupling an input connector to the input contactor.

9. The method of claim 8, wherein the plurality of configuring contactors is activated with a delay after the input contactor is triggered.

10. The method of claim 8, wherein the plurality of configuring contactors and the input contactor are triggered when a micro-switch detects that the input connector is electrically connected to the power source.

11. The method of claim 8, wherein the plurality of configuring contactors and the input contactor are powered by the pallet jack battery stack.

12. The method of claim 1, further comprising starting a timer to disconnect the pallet jack battery stack from the power source after a predetermined period of time.

13. A system for in-vehicle charging of pallet jack battery stack, the system comprising:
   a plurality of configuring contactors electrically coupled to a pallet jack battery stack;
   an input contactor electrically coupled to the pallet jack battery stack;
   an input connector electrically coupled to the input contactor connector associated with a power source; and
   a voltage monitoring circuit configured to:
      monitor a voltage level of the input connector,
      determine that the voltage level exceeds a predetermined voltage threshold, and
      based on the determination, activate the plurality of configuring contactors and the input contactor to charge the pallet jack battery stack from the power source.

14. The system of claim 13, further comprising a data logger configured to log data associated with the pallet jack battery stack.

15. The system of claim 13, further comprising a cable electrically coupled to the input connector.

16. The system of claim 13, further comprising a visual indicator, the visual indicator indicating that the pallet jack battery stack is being charged.

17. The system of claim 13, wherein the power source is an alternator.

18. The system of claim 13, wherein the power source is a battery.

19. The system of claim 13, wherein the voltage monitoring circuit is configured to activate the plurality of configuring contactors such that two or more multiples of two batteries associated with the pallet jack battery stack are interconnected in parallel for charging from the power source and serially for powering a pallet jack by the pallet jack battery stack.

20. A system for in-vehicle charging of a pallet jack battery stack, the system comprising:
   a pallet jack battery stack;
   a plurality of configuring contactors electrically coupled to the pallet jack battery stack;
   an input contactor electrically coupled to the pallet jack battery stack;
   an input connector electrically coupled to the input contactor; and
   a voltage monitoring circuit configured to:
      monitor a voltage level of the input connector associated with a power source;
      determine that the voltage level exceeds a predetermined voltage level;
      based on the determination, selectively activating the plurality of configuring contactors to electrically reconfigure two or more multiples of batteries associated with the pallet jack battery stack from a serial connection to a parallel connection;
      activate the input connector with a predetermined delay after the plurality of configuring contactors are activated; and
      charge the pallet jack battery stack from the power source.

* * * * *